Feb. 27, 1968     P. EYZAT     3,370,539
DOUBLE INJECTION PUMP FOR INTERNAL COMBUSTION ENGINES
Filed Sept. 20, 1966     18 Sheets-Sheet 1

INVENTOR
PIERRE EYZAT
BY Krafft & Wells
ATTORNEYS

Feb. 27, 1968  P. EYZAT  3,370,539
DOUBLE INJECTION PUMP FOR INTERNAL COMBUSTION ENGINES
Filed Sept. 20, 1966  18 Sheets-Sheet 2

INVENTOR
PIERRE EYZAT
BY Krafft & Wells
ATTORNEYS

Feb. 27, 1968     P. EYZAT     3,370,539
DOUBLE INJECTION PUMP FOR INTERNAL COMBUSTION ENGINES
Filed Sept. 20, 1966     18 Sheets-Sheet 9

INVENTOR
PIERRE EYZAT
BY Krafft & Wells
ATTORNEYS

Feb. 27, 1968     P. EYZAT     3,370,539
DOUBLE INJECTION PUMP FOR INTERNAL COMBUSTION ENGINES
Filed Sept. 20, 1966     18 Sheets-Sheet 13

INVENTOR
PIERRE EYZAT
BY *Krafft & Wells*
ATTORNEYS

Feb. 27, 1968     P. EYZAT     3,370,539
DOUBLE INJECTION PUMP FOR INTERNAL COMBUSTION ENGINES
Filed Sept. 20, 1966     18 Sheets-Sheet 15

INVENTOR

PIERRE EYZAT

BY   Krafft & Wells

ATTORNEYS

United States Patent Office 3,370,539
Patented Feb. 27, 1968

3,370,539
DOUBLE INJECTION PUMP FOR INTERNAL COMBUSTION ENGINES
Pierre Eyzat, Vanves, France, assignor to Institut Francais du Petrole, des Carburants et Lubrifiants, Rueil-Malmaison, France
Continuation-in-part of application Ser. Nos. 466,587, 469,486, 469,732, June 24, 1965. This application Sept. 20, 1966, Ser. No. 580,630
Claims priority, application France, June 24, 1964, 979,531; July 10, 1964, 981,591; July 17, 1964, 982,184
10 Claims. (Cl. 103—2)

This application is a continuation-in-part of copending applications Ser. Nos. 466,587; 469,486 and 469,732, all now abandoned, and applicant claims all rights and priorities of the copending applications for the present application.

The present invention relates to fuel injection pumps for internal combustion engines and has for its object certain improvements in pumps for fuel injection into internal combustion engines. These improvements relate especially to pumps of the type described in French Patent 1,336,201, the disclosure of which is relied upon.

According to the present invention the pump structure is adapted to perform two injections per cycle in each cylinder of the engine, for example at such spaced intervals as in the double injection method described in U.S. Patent No. 2,960,079, said two injections comprising a principal injection towards the end of the compression stroke, and a secondary injection preceding said principal injection.

Such a double injection results in a greater regularity of the combustion by reduction and control of the ignition delay, thereby greatly lowering the noise level, and permitting poly-fuel carburation indifferently with gas-oil or with gasoline.

It has been found that in order to realize the maximum efficiency of this double injection there must exist a certain law of variation of the quantity of fuel delivered by the secondary injection as a function of the total fuel charge, this law of variation depending on the type of engine.

Accordingly, the main object of the present invention is to provide injection pumps which perform with the maximum efficiency two injections per cycle in each cylinder of an internal combustion engine the characteristics of said pump being adapted to the type of engine.

In engines provided with precombustion chambers, where the precombustion chamber opens into the main combustion chamber by a narrow passageway, or in engines having a precombustion chamber opening more widely into the main chamber but which are thermally charged (engines operating at high running speeds or supercharged engines, for instance) the maximum efficiency of a double injection in which the two injections are spaced from each other by an interval of half a cycle is achieved by reducing the quantity of fuel used for the secondary injection as the total charge increases.

In engines with direct injection which are not thermally charged this maximum efficiency will be realized by keeping substantially constant the proportion of the fuel charge introduced by the secondary injection, or at the most allowing a slight increase of such proportion with increased charge.

In engines with an open precombustion chamber, namely those in which the precombustion chamber opens into the main combustion chamber by a relatively large passageway, or in engines not thermally charged whose precombustion chambers are opening into the main combustion chamber through a narrower passageway, or also in thermally charged engines with direct injection (engines operating at high speed or supercharged engines), the maximum efficiency of the double injection will be realized by keeping substantially constant the quantity of fuel delivered by the secondary injection when the total charge varies, or at the most in using an increased absolute amount of fuel for the secondary injection which is sufficiently moderate to correspond to a decreased proportion of the total charge when the latter increases.

One of the best known means for effecting two injections per cycle in internal combustion engines consists of providing the camshaft of the pump with a double cam, each cam effecting one injection. However, such a system does not work with sufficient regularity and often requires important structural changes.

On the contrary, it is possible, according to this invention, by simple and easy adaptations, to effect a double injection per cycle with rotary piston distributor pumps of the kind described in French Patent 1,336,201.

The invention will be described hereinafter with reference to the drawings, wherein:

FIGURE 1A represents, in the form of a development, the bore of a pump adapted to realize in an internal combustion engine a double injection in which the quantity of fuel used for the secondary injection is reduced as the total charge increases, said pump being provided with admission and distribution orifices, and the cylindrical surface of the piston provided with admission grooves and with two distribution grooves, the relative position of the bore and the piston in this figure corresponding to the beginning of the injection of a small charge;

FIGURE 1B represents a cross-sectional view of the bore of the pump and of the piston at the level of the admission orifices on the line X'–X of FIGURE 1A;

FIGURES 1C and 1D, analogous respectively to 1A and 1B, illustrate the relative positions of the bore and piston at the end of injection of a small charge;

FIGURES 5A and 5B, 6A and 6B show an arrangement of the grooves ensuring the secondary injection, which differs from that of the preceding figures and is adapted for assuring a simultaneous beginning of the principal and secondary injections, and, in association with the same admission groove, another groove providing for the pressure drop, back to low pressure, in the injection pipes which performed the secondary injection after the end of the principal injection.

Figure 7A:
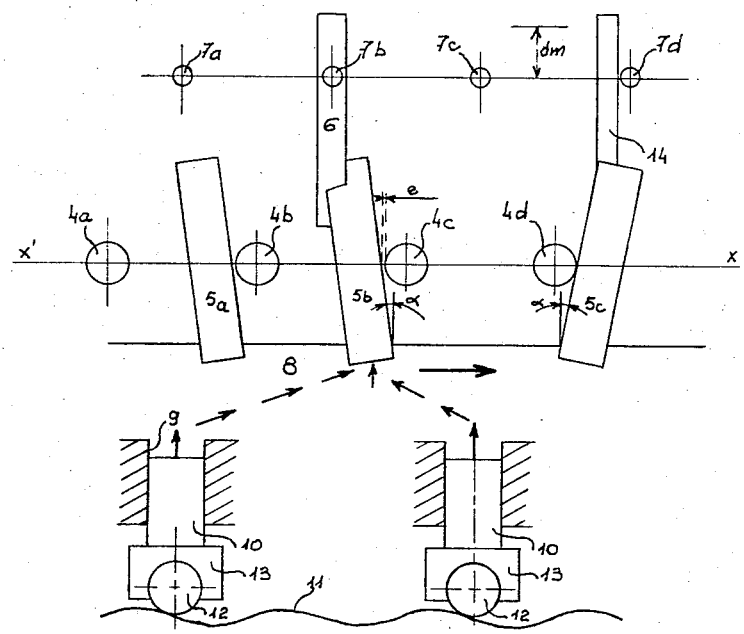
Figure 7B:
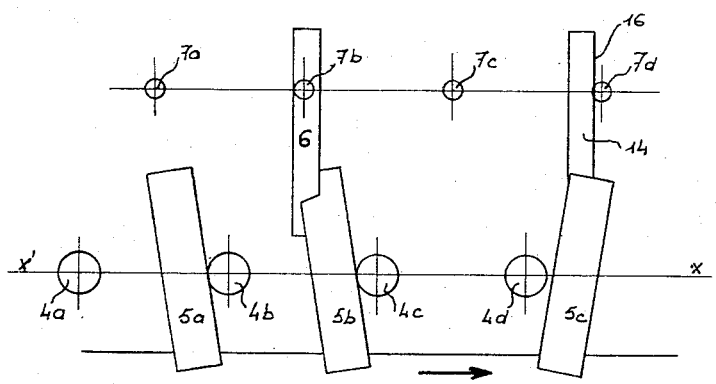
Figure 8:
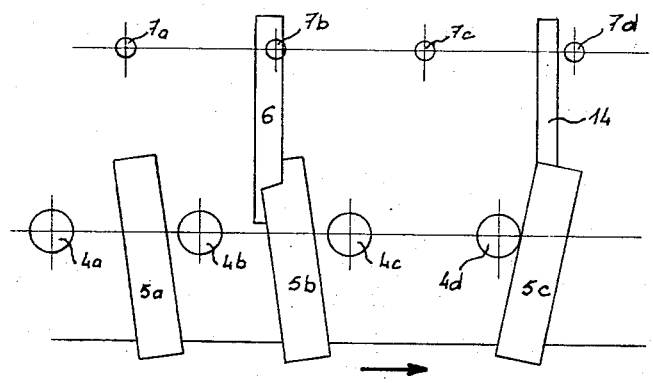
Figure 8:
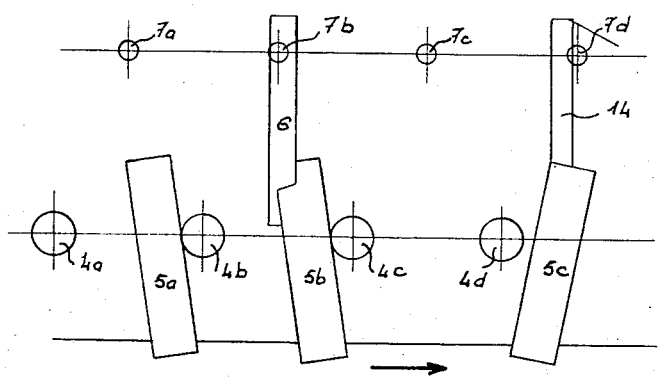
Figure 9A:
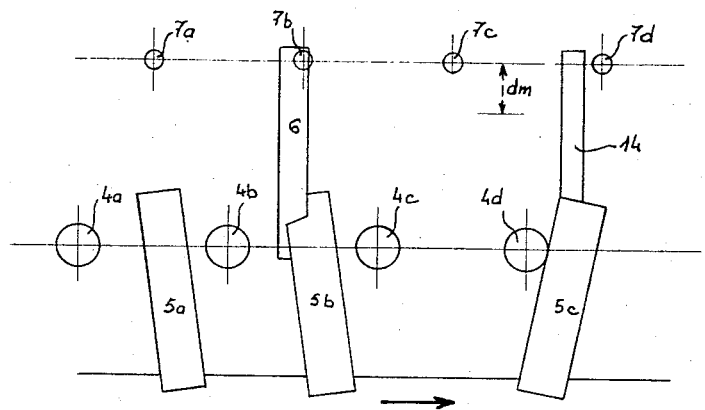
Figure 9B:
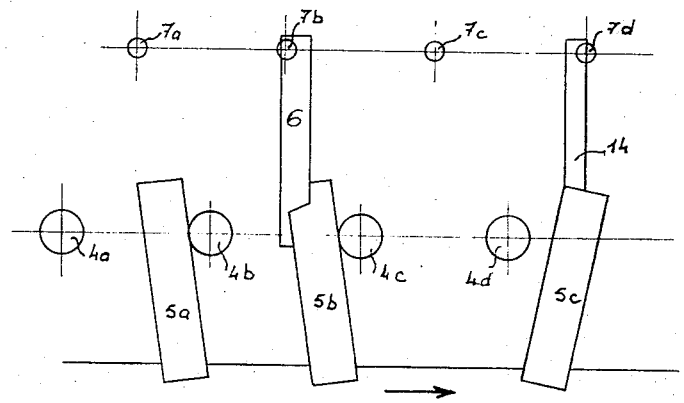
Figure 10:
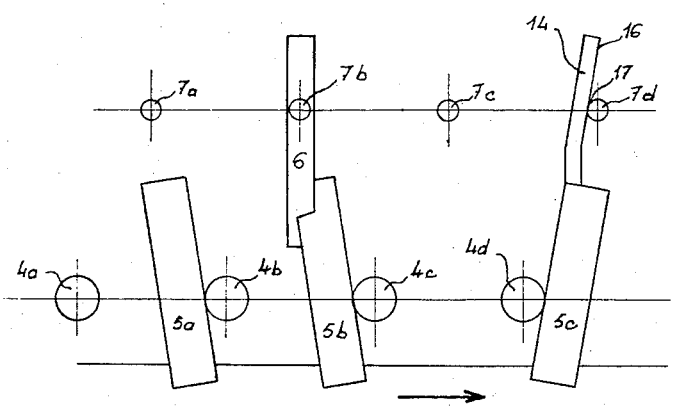
Figure 11:
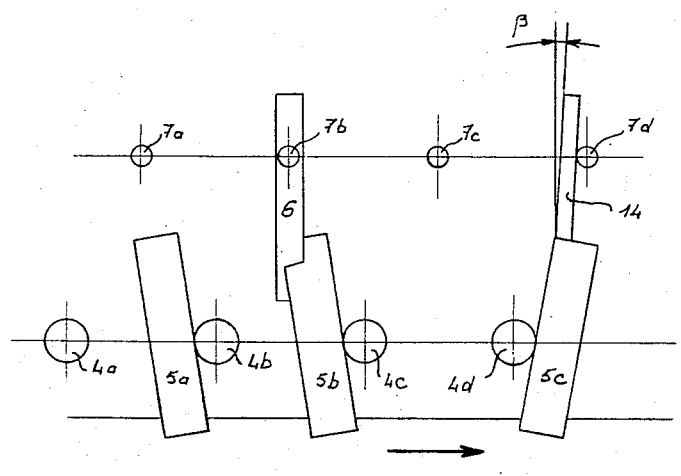
Figure 12A:
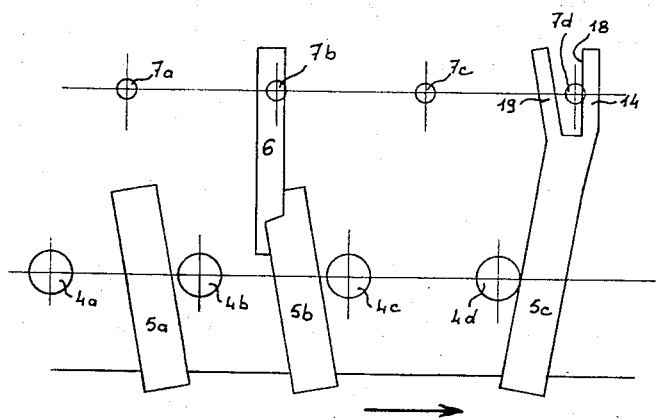
Figure 12B:
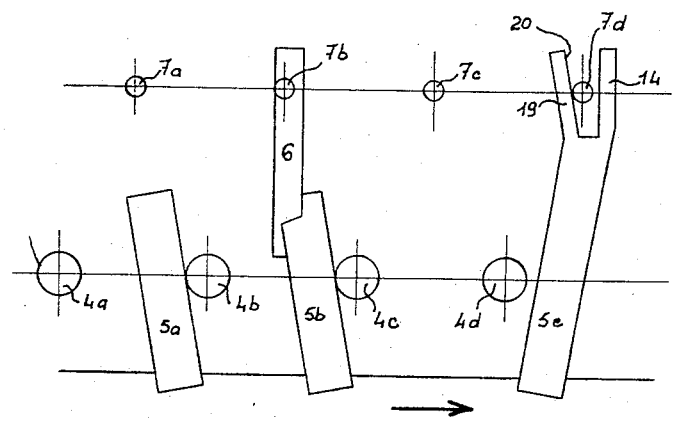

FIGURE 7A shows in the form of a development the bore of a pump adapted to realize in an internal combustion engine a double injection in which the proportion of the fuel charge introduced by the secondary injection is maintained substantially constant as the total charge varies, said pump provided with admission and distribution orifices and the cylindrical surface of the piston provided with admission grooves and two distribution grooves, the relative positions of the bore and piston in this figure corresponding to the beginning of an injection of a small charge;

FIGURE 7B shows the position of the piston relative to the bore at the end of an injection with a small charge;

FIGURE 8A and FIGURE 8B show in development the relative positions of the bore and piston at the beginning and at the end of the injection of a medium charge;

FIGURES 9A and 9B are respectively analogous to FIGURES 8A and 8B, but with the injection of a full charge;

FIGURES 10 and 11 show the grooves in position of zero charge for secondary injections, according to different laws of distribution of the charge between the injections;

FIGURES 12A and 12B show arrangements of the grooves for secondary injection which differ from those of the preceding figures in that they provide for simultaneous beginnings of the principal and secondary injections and, in association with the same admission groove, a groove for assuring a return of the injection pipes to low pressure after having effected the secondary injection after the end of the principal injection.

Figure 1A:
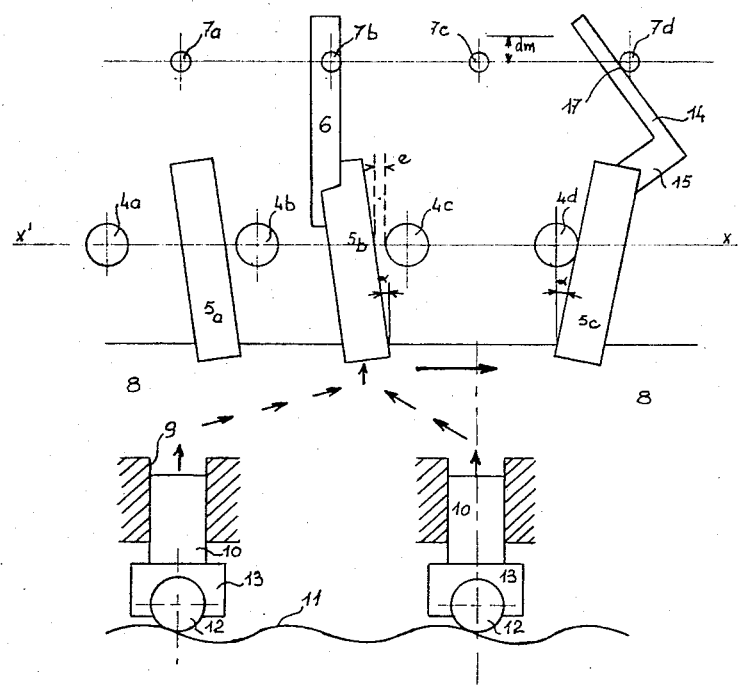
Figure 13A:
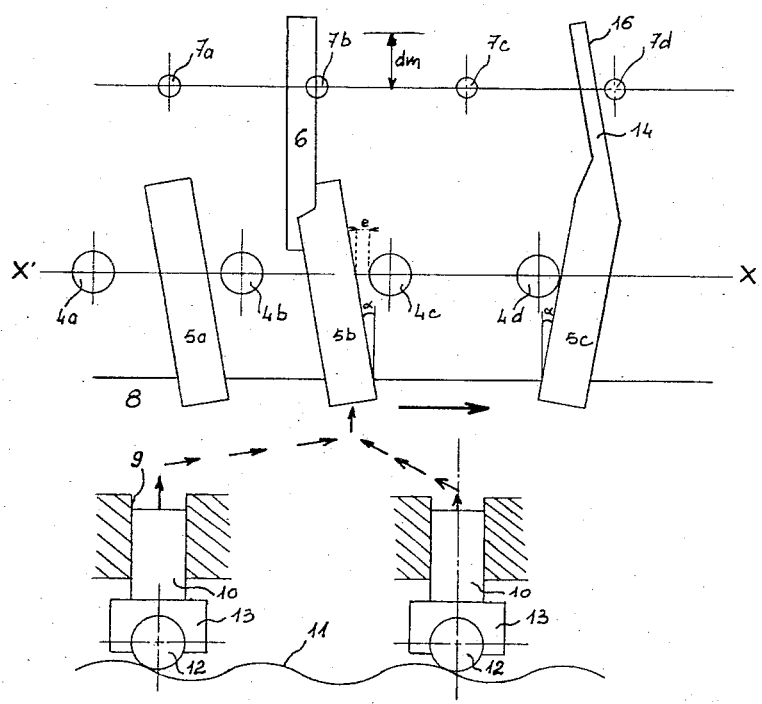
Figure 13B:
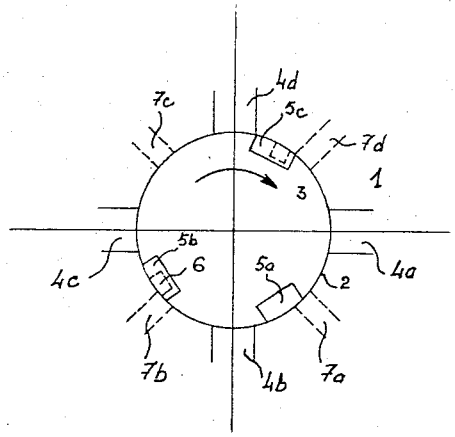
Figure 13C:
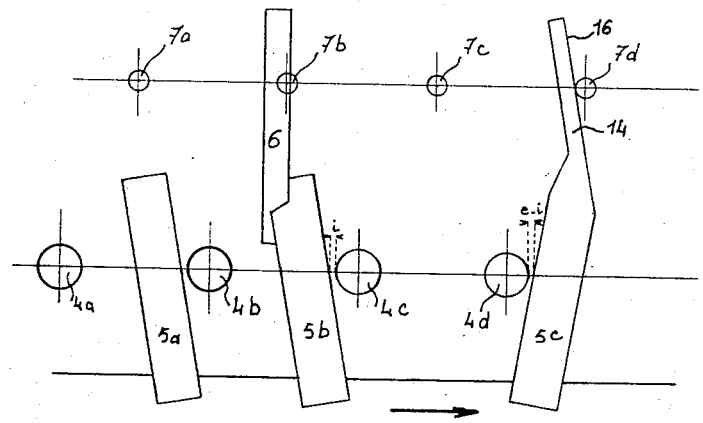
Figure 13D:
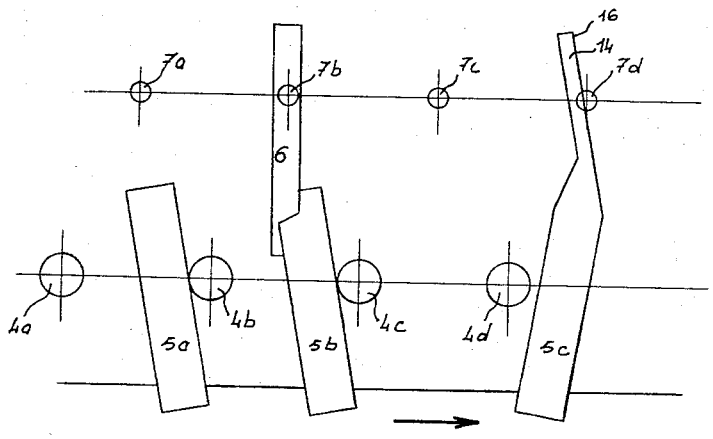
Figure 14A:
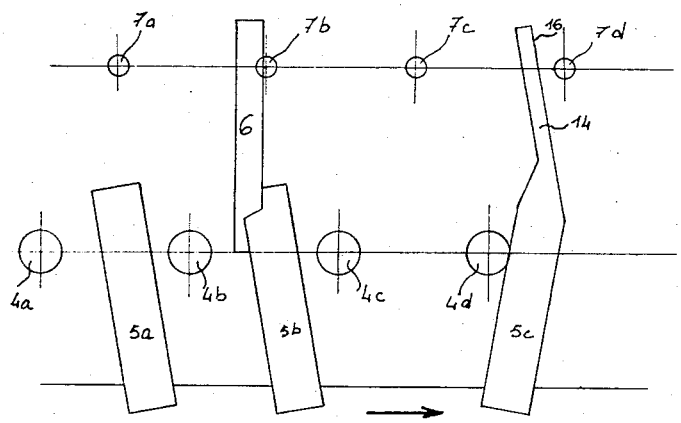
Figure 14B:
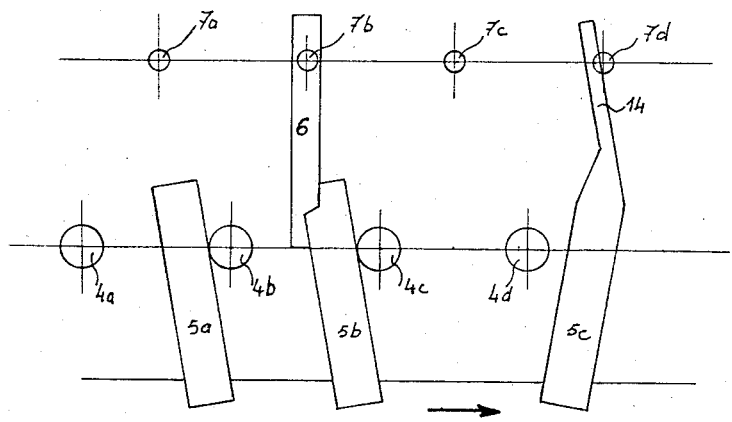
Figure 15A:
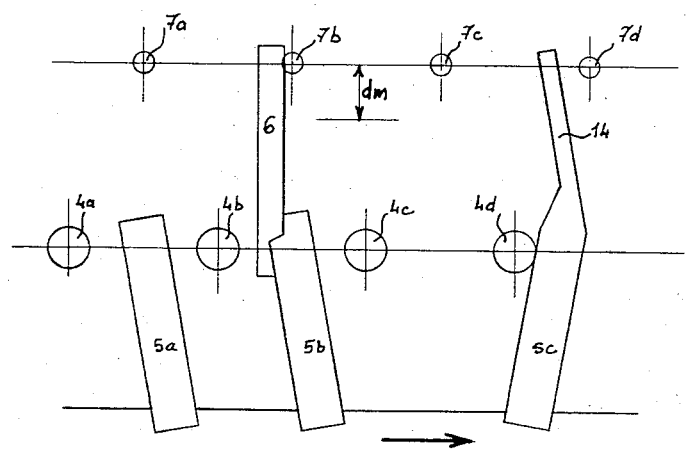
Figure 15B:
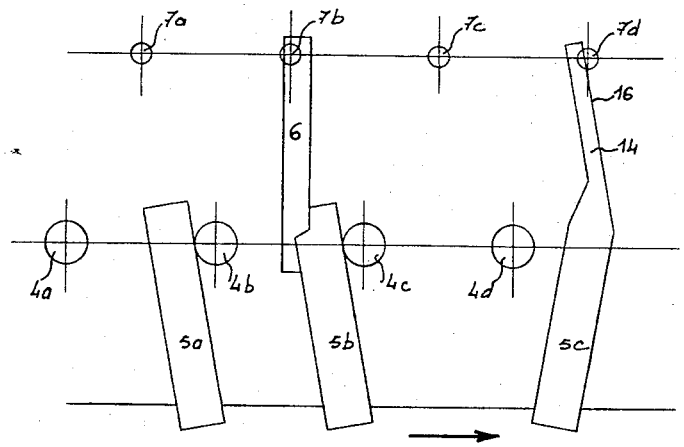
Figure 16:
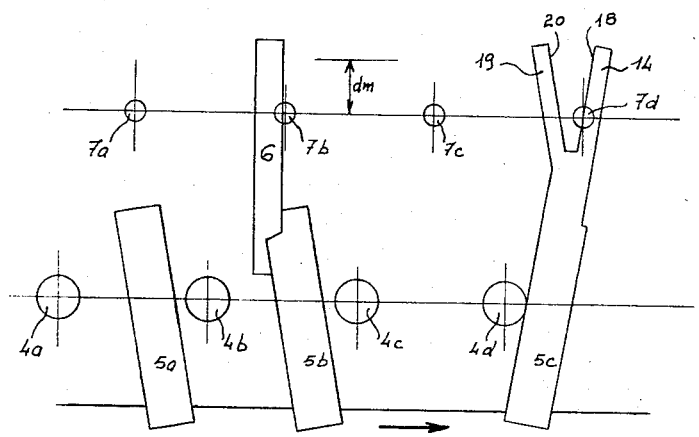
Figure 16:
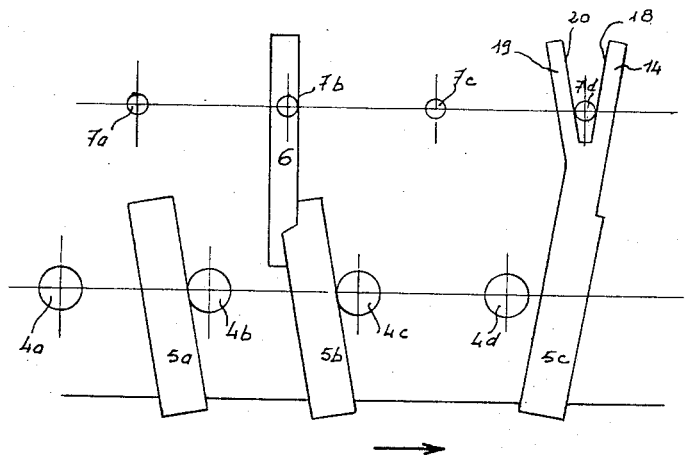

FIGURE 13A shows in development the bore of the pump adapted to realize in an internal combustion engine a double injection in which the quantity of fuel delivered by the secondary injection is kept at a substantially constant level when the total charge varies, provided with admission and distribution orifices while the cylindrical surface of the piston is provided with fuel admission grooves and two fuel distribution grooves, the relative position of the bore and piston determining the beginning of the principal injection of a small charge;

FIGURE 13B shows in cross section the bore of the pump and the piston at the level X′X of the admission orifices in FIGURE 1A;

FIGURES 13C and 13D are analogous to FIGURE 13A and show the relative position of bore and piston at the beginning and end respectively of the secondary injection for a small charge;

FIGURES 14A and 14B show in development the relative position of bore and piston corresponding respectively to the beginning and the end of the principal injection for a medium charge;

FIGURES 15A and 15B are respectively analogous to FIGURES 14A and 14B, but correspond to a full charge;

FIGURES 16A, 16B, 17A, 17B and 17C show an arrangement of grooves for assuring a secondary injection which differs from that of the preceding figures by beginning at the same time as the principal injection and associated with the admission groove, one groove assuring the return to low pressure of the injection canal which performed the secondary injection, after the end of the principal injection.

Figure 1B:
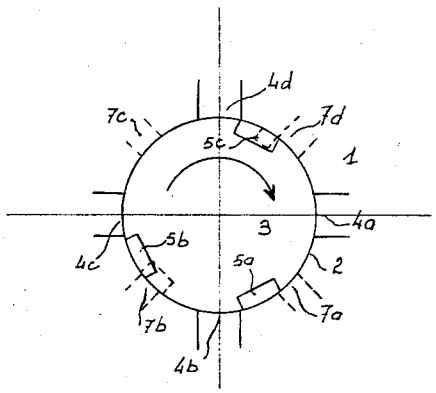
Figure 1C:
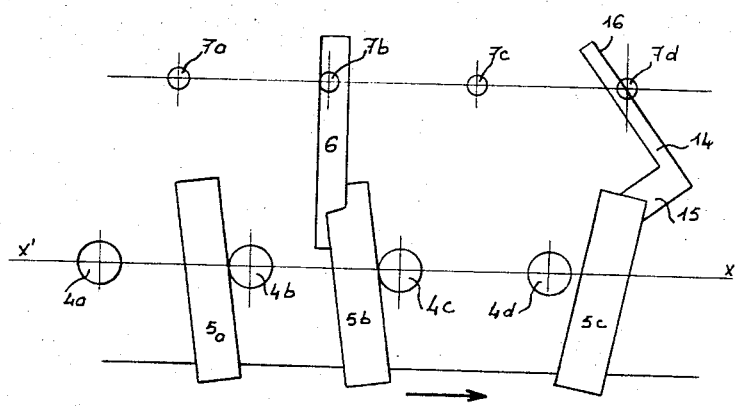
Figure 1D:
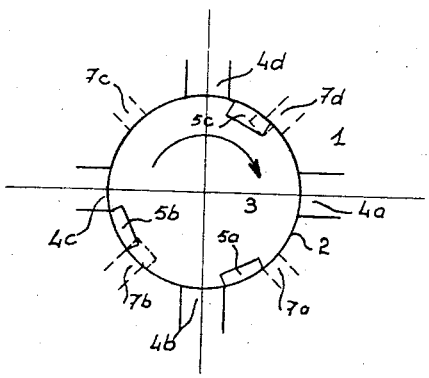

A pump of the kind considered comprises a pump shaft driven by the engine through gear means, a fixed body or pump housing 1 (FIGURE 1B), in which there is provided a cylindrical bore 2 in which the distributor piston 3 is rotatably mounted said distributor piston being driven in rotation by said pump shaft. Feed orifices 4a, 4b, 4c and 4d open into the bore at a level such that they will enter successively into communication with the longitudinal grooves 5a, 5b and 5c in the periphery of the piston, inclined at an angle α to the axis of the piston (FIGURE 1A). One of these longitudinal grooves 5b communicates with a second longitudinal groove 6 (FIGURE 1A), parallel to the axis of the distributor piston and which extends to groove to such a level that this second groove can communicate successively, during the rotation of the piston, with the discharge or injection orifices 7a, 7b, 7c and 7d of the pipes that feed the different injectors (shown in dotted lines on FIGURE 1B).

The different longitudinal grooves communicate permanently with an annular space 8 which is supplied with fuel each time when a groove 5a, 5b or 5c comes into communication with a feed orifice 4a, 4b, 4c or 4d.

Figure 2:
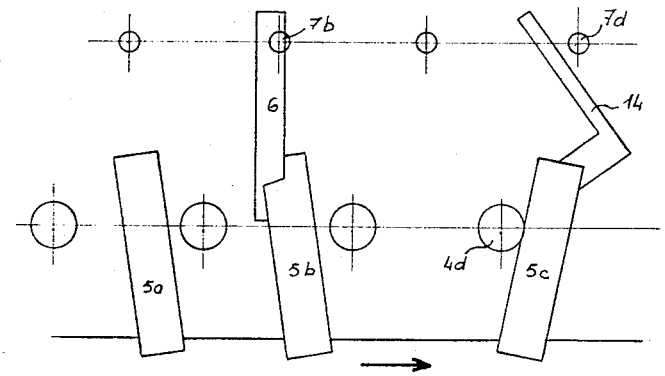
FIGURES 2A and 2B represent in development the bore and the piston in their relative positions corresponding respectively to the beginning and the end of injection of a medium charge.
Figure 2:
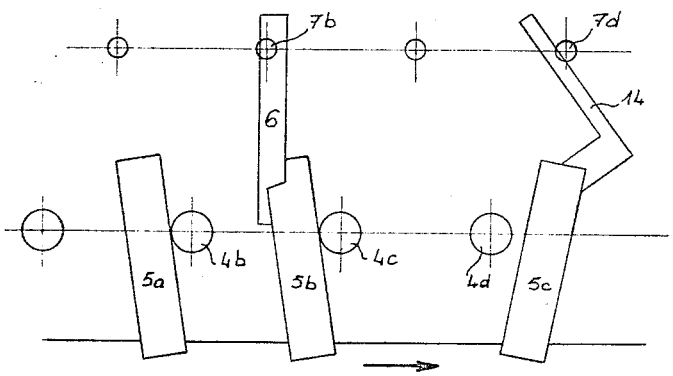
Figure 3:
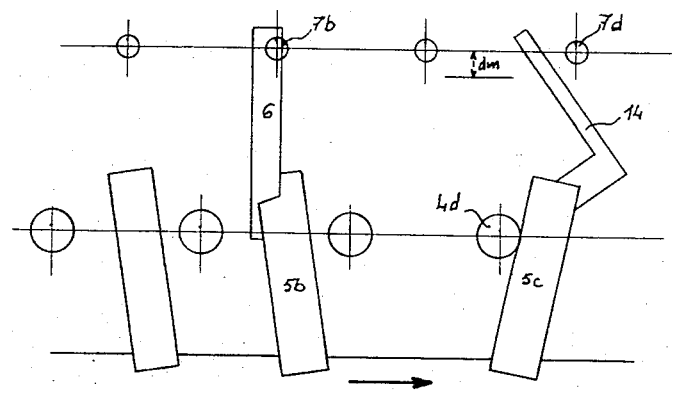
FIGURES 3A and 3B are respectively analogous to FIGURES 2A and 2B, but corresponding to a full charge.
Figure 3:
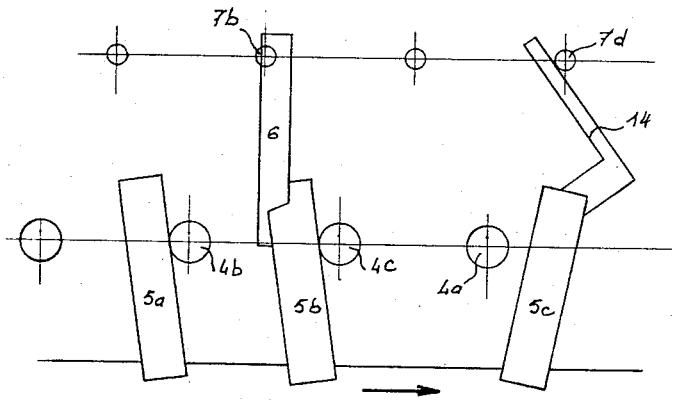

As soon as all communication between the grooves 5 and the orifices 4 is shut off, the fuel is imprisoned in said grooves and in the annular space 8. The annular space 8 is in communication with the bores of one or more cylinders 9 in which the pistons 10, having pusher blocks 13 at one end thereof and rollers 12 solid therewith, are actuated by the rotation of the annular cam 11 driven by the pump shaft, said rollers 12 being pushed in contact with said cam 11 by spring means (not shown, see French Patent 1,336,201, FIGURE 2). The rollers 12 and the cam 11 are so cooperating that the action of the cam on the piston forces the fuel contained in the annular space 8 through the longitudinal (feed and discharge) grooves at the time when the latter communicate with said discharge orifices. The fuel which is compressed by these pistons is driven out under high pressure through the orifices 7 each time when an orifice 7a, 7b, 7c or 7d, comes into communication with the groove 6, while during such time none of the longitudinal grooves 5 are in communication with the feed orifices 4.

This pump system has the advantage of permitting the advance of the injection to be varied by setting the angular position of the distributor piston 3 in relation to its bore, and also of permitting the discharge rate per pumping cycle to be changed by giving the piston a longitudinal displacement in such a manner as to change the angular interval between the grooves 5 at the level of the orifices 4 in consequence of the inclination of these grooves to the axis of the piston, and thereby permitting also the duration of the injection to be changed.

The vertical or longitudinal displacement of the distributor piston 3 relative to the feed orifices 4a, 4b, 4c and 4d, and injection orifices 7a, 7b, 7c, 7d is accomplished by adjustment means which may be controlled by regulation system as disclosed in French Patent 1,336,201. In said French patent, said regulation system is obtained by the cooperation of a helical groove with a pin displaceable therein.

The embodiments of the present invention illustrated by FIGURES 1A to 5B are adapted to engines provided with precombustion chambers where the precombustion chamber opens into the main combustion chamber by a narrow passageway, or in engines having a precombustion chamber opening more widely into the main chamber but which are thermally charged (engines operating at high running speeds or supercharged engines, for instance).

Precombustion chamber diesel engines are disclosed in "Internal Combustion Engines, Analysis and Practice," by Edward T. Obert (1950), published by the International Textbook Company, on pages 494 to 502, with particular reference to the pictures on pp. 494 and 496.

It is known that the operation of engines of this kind can be improved by substituting for the single injection per cycle, two injections at half-cycle intervals, distributed into a principal injection toward the end of the compression stroke and a secondary injection a half-cycle earlier. The improvement consists mainly in greater regularity of the combustion by reduction and control of the ignition delay, thereby lowering considerably the noise level and permitting polyfuel carburation, i.e., feeding indifferently with gas-oil or fuel. I have, however, found that substantial improvement cannot be obtained by use of the previously known double injection systems except for certain values of the charge, and that when the latter is modified, the double injection per cycle loses its interest.

This is especially true for engines with precombustion chambers of the type above mentioned for which I have observed that maximum efficiency of the double injection system can be achieved only by reducing the quantity of fuel used for the secondary injection as the total charge increases.

Now the previously known systems for effecting two injections per cycle at intervals of about half a cycle do not provide for a distribution of the total charge between the two injections whereby the secondary injection diminishes in value with increasing total charge.

The use of double cams for example, tends on the contrary for low charges to a reduction if not suppression of the secondary injection.

The use of junction channels for the injection pipes tends at best to assure a secondary injection which is substantially constant in amount when the total injected charge varies, and therefore does not allow the secondary injection to decrease when the total charge increases, which would correspond to the optimum condition for application of the double injection process to engines of the precombustion chamber type above mentioned.

None of these prior devices have solved the problems involved in the adaptation of the system of double injection to engines having precombustion chambers.

The present invention provides a means for solving this problem by adaptation of the pumps of the rotary distributor piston type which are described in French Patent 1,336,201.

The layout of the present invention is characterized mainly by the fact that at the same time while the principal injection occurs in one of the engine cylinders, for example the cylinder fed by the distribution pipe which opens into the bore of the pump through the orifice 7b, which cylinder is designated as cylinder b, it permits also another injection called "secondary" in another cylinder d (in U.S. Patent 2,960,079, this cylinder would be the one in which the piston is positioned at a half-cycle interval from that of the piston position in cylinder b) through the distribution pipe that opens into the bore through orifice 7d by means of supplementary groove 14.

The position and inclination of the leading edge of the groove 14 relative to the axis of the distributor piston (by "leading edge" is meant the edge of the groove which meets the first affixed generatrix of the bore during the normal rotation of the piston which assures the injections) are determined in such a manner as to adjust the quantity of fuel of the secondary injection mainly as a function of the total charge.

The direction of this inclination will determine the timing of this secondary injection relative to the principal injection.

In fact a negative inclination relative to the direction of rotation of the distributor piston would correspond to a common ending for the principal injection and the secondary injection and a beginning of the secondary injection which is variable with the charge, whereas a positive inclination of the groove 14 relative to the direction of rotation of the distributor piston would correspond on the contrary to a common beginning of injection for the principal and for the secondary injection, and to an ending of the secondary injection which is variable with the charge.

A fixed common ending of injection is generally preferable because it is effected by putting the grooves 5a and 5b into communication with low pressure feed orifices 4b and 4c, which makes it possible (because of the negative inclination of the groove 14), to keep the orifice 7d of the channel through which is effected the secondary injection, in communication with the groove 14 after the end of the injection. The result of this is a rapid return to low pressure of the fuel contained in said channel which avoids any danger of uncontrollable parasitic injections which could result from pressure waves in these channels if the orifice 7d were obstructed.

However, with a fixed common ending of the injection, it may be more difficult to regulate with accuracy the quantity of fuel of the secondary injection because, at the moment when it begins, namely when the groove 14 uncovers the orifice 7d, the pressure prevailing in the pump is transmitted to the secondary injection channels which, depending on the rapidity of such action, can cause waves of high pressure which would keep the injector open during a longer period.

In fact, however, since the orifice 7d is only gradually uncovered, such pressure waves do not appreciably change the distribution of charge between the two injections.

It is also possible to have a beginning of the injection which is the same for the principal and secondary injections and with a variable ending of the secondary injection without any danger of uncontrollable parasitic injections, by substituting for the single groove 14 two grooves, one of which controls the secondary injection up to the point where it ceases to communicate with the orifice 7d and where the other groove puts this orifice back into communication with the admission orifices of low pressure as soon as the principal injection has ended. Such a system with double grooves is illustrated by FIGURES 5A, 5B, 6A and 6B.

The functioning of the device according to the invention will be described more in detail with reference to the above-mentioned case, where the secondary injection is effected at about a half-cycle interval from the principal injection.

In the embodiment of FIGURE 1A is shown the position of the groove 14 relative to the orifice 7d of the distribution pipe which corresponds, for a low charge, to the beginning of the injection. The communication between the groove 5c and the orifice 4d having just been interrupted, the injection then occurs simultaneously through grooves 6 and 14 and their respective orifices 7b and 7d. These two injections end simultaneously when the grooves 5a and 5b enter into communication respectively with the low pressure feed orifices 4b and 4c (this position being shown in FIGURE 1B). In such a case the fraction of the charge corresponding to the secondary injection will be equal to that of the principal injection since the orifices 7b and 7d remain respectively in communication with the channels 6 and 14 until the end of the injection (such position being shown in FIGURES 1C and 1D).

FIGURE 2A shows the position of the grooves relative to the orifices for a medium charge at the beginning of the injection.

The injection commences as soon as the groove 5c ceases to communicate with the orifice 4d. But the downward shift of the distributor piston, by which the charge can be varied, causes the groove 14 to be no longer in communication with the orifice 7d The result is that only the principal injection through grooves 5b and 6 and orifice 7b will then occur. The secondary injection will not occur until a little before the end of the principal injection (position shown in FIGURE 2B). This figure shows that the principal injection is stopped by putting the grooves 5a and 5b into communication with the admission orifices 4b and 4c respectively. The secondary injection ends at the same time as the principal injection and corresponds then to a much smaller proportion of the total charge than the principal injection.

As will be seen by examination of FIGURES 3A and 3B which show the position of the grooves in the piston relative to the orifices in the bore in the case of a high charge (e.g., full charge), it will be possible to suppress completely the secondary injection at high charges by avoiding communication of the orifice 7d with the groove 14 until the grooves 5a and 5b enter into communication with the feed orifices 4b and 4c (position shown in FIGURE 3B) or thereafter.

The relative positions of the grooves in the piston and the orifices in the bore in FIGURES 3A and 3B can be derived from the preceding figures by a simple vertical displacement corresponding to a shifting of the piston in the bore in a direction parallel to its rotation axis.

FIGURE 3A shows the position at the beginning of the injection, which is reached when the groove 5c ceases to communicate with the feed orifice 4d. The principal injection then occurs through the grooves 5b, 6 and the orifice 7b none of the grooves 5 then being in communication with the feed orifices.

The principal injection continues until the grooves 5a and 5b enter simultaneously into communication with the orifices 4b and 4c, respectively.

But in this position, shown in FIGURE 3B, it will be seen that the groove 14 has not yet entered into communication with the orifice 7d. Now at the moment when this communication is established, the grooves 5a and 5b will come into communication with the orifices 4b and 4c, in such a manner that there will not be any injection through orifice 7d. At full charge, there will then not be any secondary injection.

It will be seen that with the inclination of the groove 14 represented in the various FIGURES 1A, 1C, 2A, 2B, 3A, and 3B, it is possible to vary the secondary injection in inverse ratio to the charge, which corresponds, for engines having a precombustion chamber which open into the main chamber by a narrow passageway or for thermally charged engines to optimal conditions for the double injection method.

Figure 4A:
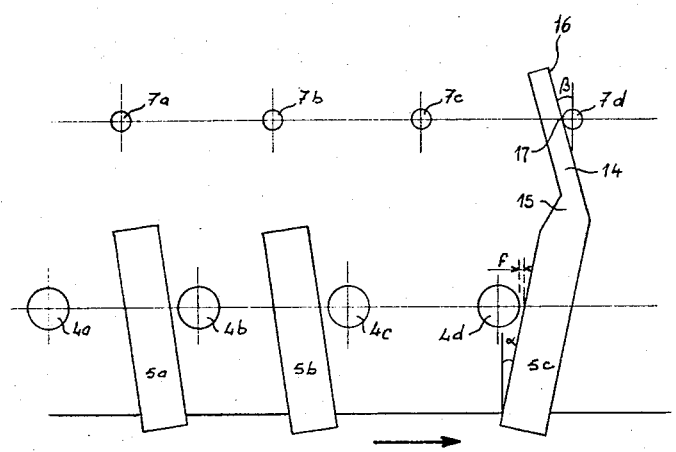
FIGURES 4A and 4B illustrate the positions of small charge and full charge corresponding to the application of a different law of distribution between the injections of the cycle.

It is easy to understand that by increasing the inclination of the groove 14 with respect to the axis of the piston, the amount of the charge for which there will be a suppression of the secondary injection will be lower. Conversely, a smaller inclination of the groove 14 can make it possible to maintain a secondary injection, even at full charge, as shown in FIGURES 4A and 4B.

Figure 4B:
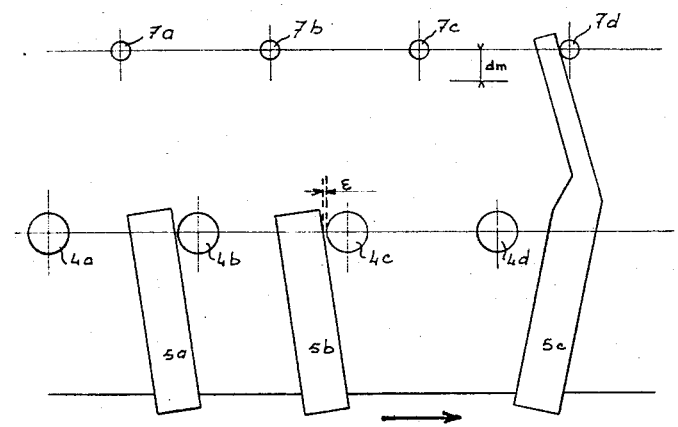

FIGURE 4B shows that at full charge the secondary injection extends over a period corresponding to the peripheral displacement $\epsilon$ of the piston. On the other hand, FIGURE 4A shows the case where, with a small charge, the secondary injection does not commence until after a rotation of the distribution piston coresponding to a certain peripheral interval $f$ after the beginning of the principal injection (which commences when the groove 5c is tangent to the orifice 4d).

Without changing the inclination of the groove 14, it is also possible to modify the law of distribution of the charge between the principal and the secondary injection by moving the leading edge 16 of the groove 14 parallel to itself and in lengthening or shortening the connecting portion 15. If for example, the leading edge 16 of the groove 14 is moved parallel to itself in a direction opposite to the normal direction of rotation of the distributor piston, the secondary injection is reduced by a constant amount for different amounts of the charge, so that by sufficiently reducing the total charge, the secondary injection can be eliminated.

Conversely, a displacement of the leading edge 16 of the groove 14 in the normal direction of rotation of the piston increases the secondary injection by a constant amount for different charges.

It is possible in a general manner to determine the position and the inclination of the leading edge 16 of the groove 14 so as to obtain a secondary injection of definite values $I_0$ at small charge and $I_m$ at full charge by tracing on the piston while positioned for a low charge and at the beginning of the secondary injection, a straight tangent at the leading edge 17 of the secondary injection orifice (defined as that which will be first met by a fixed generatrix of the piston when the latter rotates in its normal direction) and whose inclination to the vertical at the point of tangency is $$\tan \beta = -\left(\tan \alpha + \frac{e-\epsilon}{d_m}\right)$$

where, as can be seen on FIGURES 4A, 4B and FIGURE 1, $\alpha$ is the absolute value of the angle of inclination, relative to the axis of the piston, of grooves 5b and 5c, $e$ is the peripheral interval covered by the rotation of the piston during the principal and secondary injections at small charge, $\epsilon$ is the peripheral interval covered by the rotation of the piston during the secondary injection $I_m$ at full charge (FIGURE 4B, the value of $\epsilon$ being zero in FIGURE 3B) and $d_m$ is the displacement of the piston parallel to its axis which corresponds to the passage from small charge to full charge (FIGURES 1A and 3A).

In fact, this displacement of the piston, with a pump of the kind shown, is accompanied by a rotation of the piston in a direction opposite to its normal direction of rotation and of an amplitude such that the angular position of the groove 5c with respect to the orifice 4d would not be changed, namely by a rotation of $-d_m \tan \alpha$. The injections will then occur at full charge during a rotation of the piston corresponding to a peripheral distance of $e$, increased by $2d_m \tan \alpha$. The beginning of the secondary injection corresponds to a peripheral displacement of $2d_m \tan \alpha + e - \epsilon$ relative to the beginning of the principal injection at full charge, or a displacement of $$-d_m \tan \alpha + 2d_m \tan \alpha + e - \epsilon = d_m \tan \alpha + e - \epsilon$$

relative to the beginning of the injection at small charge.

The inclination of the leading edge 16 of the groove 14 should therefore be equal to $$\tan \beta = \frac{d_m \tan \alpha + e - \epsilon}{d_m} - \left(\tan \alpha + \frac{e-\epsilon}{d_m}\right)$$

This value of $\tan \beta$ remains applicable even for negative values of $\epsilon$ corresponding to a suppression of the secondary injection for a charge less than the full charge.

Of course the position chosen for tangency of the leading edge of the groove 14 with the orifice 7d for a small charge corresponds only to the particular case of substantial equality of principal and secondary injections at small charge. A different distribution between the injections at small charge is obtained by drawing the line that represents the leading edge of the groove 14 from a point at the same height as the point of tangency but at a distance $f$ ahead of the latter. In this case the extent of rotation of the piston corresponding to the secondary injection with small charge will not be more than that corresponding to the peripheral distance $e-f$ (FIGURE 4A), and the inclination of the leading edge of the groove 14 will be equal to $$-\left(\tan \alpha + \frac{e-f-\epsilon}{d_m}\right)$$

In the case where the two injections commence simultaneously (FIGURES 5A, 5B, 6A and 6B), the amount of fuel delivered in the secondary injection is determined by the time at which the secondary injection is terminated by interruption of communication between the groove 14 and the orifice 7d. This is then the position and the inclination of the trailing edge 18 of the groove 14 (the trailing edge being defined as that which will be the last met by a fixed generatrix of the bore during the normal rotation of the piston), which determines the law of distribution of the charge between the two injections.

The end of the secondary injection will correspond at small charge (position represented by FIGURE 5A), to a peripheral distance of $e-f$ covered by the piston rotation ($e$ and $f$ are represented respectively in FIGURES 5A and 5B) after the common beginning of the two injections (position illustrated in FIGURE 5A), and at full charge to a peripheral distance of $\epsilon$ covered by the piston rotation (see FIG. 6A) after the common beginning of the two injections, or to $-d_m \tan \alpha + \epsilon$ after the common beginning of the injections at small charge. It follows, therefore, that the trailing edge 18 of the groove 14 will be defined by a straight line drawn on the cylindrical surface of the piston when the latter is in the position corresponding to the end of the secondary injection, tangent to the orifice 7d on the trailing edge of the latter (diametrically opposite to the leading edge thereof), with a slope equal to $$\tan \beta = \tan \alpha + \frac{e-f-\epsilon}{d_m}$$

Figure 5A:
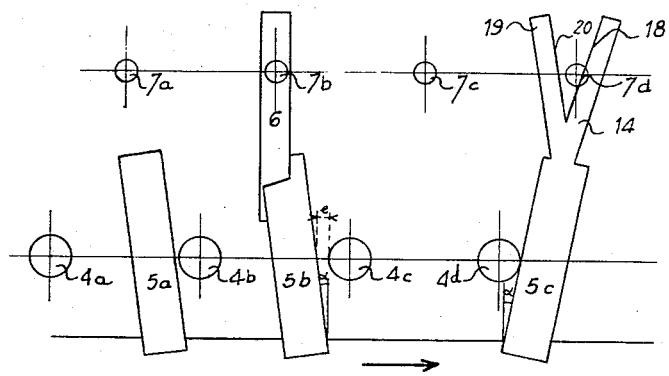
Figure 5B:
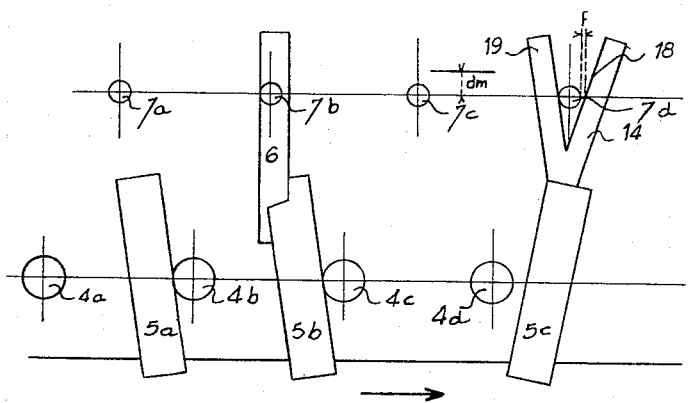
Figure 6A:
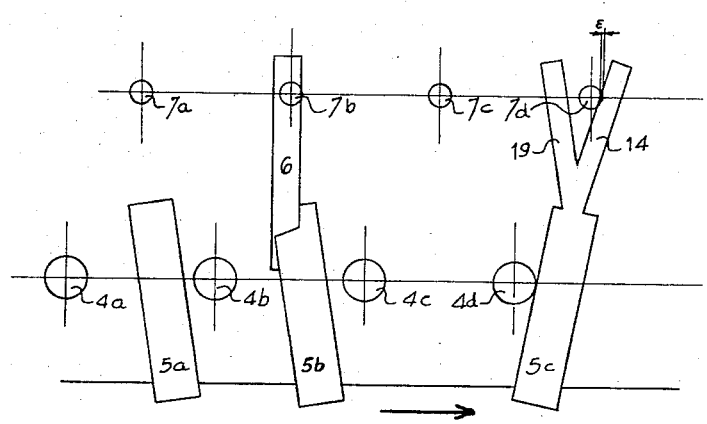
Figure 6B:
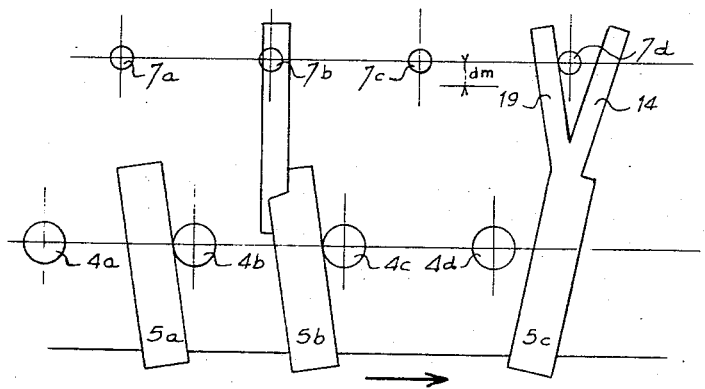

(See Figure 5B)

In order to facilitate the decompression of the fuel in the injection pipe fed by the orifice 7d, it can be advantageous to provide a second groove 19 (FIGURES 5A, 5B, 6A and 6B), permitting a return to low pressure in the injection pipe terminating at the orifice 7d, just after the end of the principal injection.

This return to low pressure will be achieved when the leading edge 20 of the groove 19 will leave its position of tangency to the orifice 7d, on the leading edge thereof (position illustrated by FIGS. 5B and 6B) which corresponds to the end of the principal injection, and intersect said orifice.

The leading edge 20 of the groove 19 will correspond to a straight line drawn from this point of tangency with a slope of $-\tan \alpha$ since the end of the principal injection at full charge will be spaced from the end of the principal injection at small charge by $$-d_m \tan \alpha + 2d_m \tan \alpha = d_m \tan \alpha$$

The embodiments of the present invention illustrated by FIGURES 7A to 12B are adapted to effect two injections per cycle in each cylinder, preferably a half cycle from each other, in engines with direct injection which are not thermally charged.

I have observed that in engines with direct injection of this kind the maximum efficiency of the system of double injection cannot be realized except by keeping substantially constant the proportion of the charge of fuel which is introduced by the secondary injection, or at the most permitting a slight increase of such portion with increased charge.

A system adapted to perform a double injection will be described with reference to the case in which the secondary injection is performed at an interval of about half a cycle from the principal injection.

FIGURE 7A shows as an example the relative position of the groove 14 relative to the orifice 7d of the distribution pipe which corresponds, for a low charge, to the beginning of the injection. Communication having just ceased between the groove 5c and the orifice 4d, the principal injection commences through the groove 6 and the corresponding orifice 7b.

The secondary injection only begins when the leading edge of the groove 14 uncovers the orifice 7d.

These two injections terminate simultaneously when the grooves 5a and 5b enter into communication respectively with the low pressure feed orifices 4b and 4c after reaching the position shown in FIGURE 7B.

FIGURE 8A shows the relative positions of the grooves relative to the orifices for a medium charge at the beginning of the injection.

The injection begins as soon as the groove 5c ceases to communicate with the orifice 4d. But the downward displacement of the distributor piston, by which the charge is varied, will not cause the groove 14 to communicate with the orifice 7d until after the piston has been rotated through a greater course than for a small charge. At the end of the injection, as shown in FIGURE 8B, the principal injection has stopped by bringing the grooves 5a and 5b into communication with the admission orifices 4b and 4c, respectively. The secondary injection will be ended at the same time as the principal injection and will deliver a smaller portion of the total charge than the latter.

The relative positions of the grooves of the piston and of orifices in the bore in FIGURES 9A and 9B are derived from the preceding figures by a simple vertical shifting corresponding to a displacement of the distributor piston parallel to its axis of rotation in its bore, which has the effect of increasing the total charge (the maximum displacement $d_m$ being shown in FIGURES 7A and 9A).

FIGURE 9A shows the position at the beginning of the injection when the groove 5c ceases to communicate with the feed orifice 4d. The principal injection occurs then through the grooves 5b, 6 and the orifice 7b, none of the grooves 5 being then in communication with the feed orifices.

This principal injection continues until the grooves 5a and 5b come simultaneously into communication with the orifices 4b and 4c, respectively (in the position shown in FIG. 9B).

In case it is desired to have the principal and secondary injections end at the same time, the proportion of the charge delivered by the latter will be determined by the inclination of the leading edge of the groove 14.

If $1/n$ represents the portion of the total charge which is delivered by the secondary injection, and it is desired to keep such portion constant whatever the level of the total charge may be, the fraction of the injection course of the distributor piston corresponding to the secondary injection will be approximately $2/n$, since during this course the fuel delivered by the pump is about equally divided between the two injections.

In practice, however, there will not be an exactly equal division of the fuel between the two injections during the course $2/n$ because pressure waves will be produced which, as stated above, generally tend to increase the secondary injection at the expense of the principal injection. The following calculation for determining the inclination $\beta$ of the leading edge of the groove 14 is nevertheless valuable if $2/n$ designates the portion of the charge delivered by the secondary injection corresponding to a course of rotation of the piston equal to a $2/n$ fraction of the total injection.

From this it follows that the fraction of the course of rotation of the piston during which only the principal injection occurs, will be $1-2/n$.

The starting point of the principal injection varies with the charge by $-d \tan \alpha$, since the displacement $d$ of the piston parallel to its axis, from the position which it occupies for zero injection, is accompanied by a rotation of the latter in a direction opposite to its normal direction of rotation, and of an amplitude such that the angular position of the groove 5c, relative to the orifice 4d, would not be changed, namely, a rotation of $-d \tan \alpha$, where $\alpha$ represents the absolute value of the angle of inclination of the grooves 5b and 5c relative to the axis of the distributor piston. It follows from this that the leading edge of the grooves 14 after a rotation of:

$$-d \tan \alpha + \left(1 - \frac{2}{n}\right) 2d \tan \alpha = d \tan \alpha \left(1 - \frac{4}{n}\right)$$

should be tangent to the orifice 7d.

From this it follows that it should correspond, on the distributor piston, to a tangent drawn to the orifice 7d, from the trailing side of the latter, with a slope relative to the axis of the piston:

$$\tan \beta = -\frac{d \tan \alpha \left(1 - \frac{4}{n}\right)}{d} = \tan \alpha \left(\frac{4}{n} - 1\right)$$

when the piston is in a position of zero injection, namely when the leading edge of groove 5b is tangent to orifice 4c at the leading side of the latter (the leading side of an orifice of the bore being defined as being the side that is encountered first by a fixed generatrix on the cylinder during rotation of the latter in the normal direction of rotation) and that simultaneously the trailing side of the groove 5c is tangent to the orifice 4d at the trailing side of the latter (in the position shown in FIGURES 10 and 11).

On FIGURES 7A, 7B, 8A, 8B, 9A and 9B, the leading edge of the groove 14 is parallel to the axis of the piston, corresponding to $\tan \beta = 0$ so that $n=4$. The secondary injection should then correspond to approximately a quarter of the total charge for any amount of the latter.

FIGURE 10 shows an inclination of the groove 14 which assures a division by half of the charge between the two injections. $n$ is then 2 and the preceding formula gives: $\tan \beta = \tan \alpha$. The leading edge 16 of the groove 14 corresponds then to a tangent to the leading edge 17 of the orifice 7d drawn parallel to the groove 5c.

Such a division between the two injections could be obtained likewise by a groove 14 of different inclination but sufficiently wide to remain in continual communication with the orifice 7d during the entire course of the injection.

FIGURE 11 shows the case where the groove 14 has the inclination given by the preceding formula with $n=3$ so that $\tan \beta = (1/3) \tan \alpha$. This inclination corresponds theoretically (that is to say without taking into consideration the effect of pressure waves, which moreover is variable according to the lengths of the injection pipes) to a division of the charge in the ratio of 1/3 for the secondary injection and 2/3 for the principal injection.

FIGURES 12A and 12B show a position of the groove 14 relative to the orifice 7d which assures a simultaneous beginning of the principal and secondary injections. In this case the secondary injections end before the principal injection (except in the specific case of a division of the charge into halves between the two injections) in consequence of the interruption of communication between the groove 14 and the orifice 7d.

As the figure shows, in such a case the trailing edge 18 of the groove 14 corresponds, on the piston in its position at the end of the secondary injection, to the tangent drawn to the orifice 7d at the trailing side of the latter with an inclination equal to:

$$\tan \beta = \tan \alpha \left(1 - \frac{4}{n}\right)$$

In effect, the end of the secondary injection occurs at an interval of $2/n$ times the entire course from the common beginning of the injections, namely $(2/n)2d \tan \alpha$. Since the injection begins at an interval of $-d \tan \alpha$ relative to the corresponding position of a zero injection course, with reference to this last position the end of the secondary injection occurs at an interval of $$d \tan \alpha \left(\frac{4}{n} - 1\right)$$

while the piston is displaced parallel to its axis toward the base of $d$. The inclination of the trailing edge of groove 14 is then definitely $$\tan \beta = -\frac{d \tan \alpha \left(\frac{4}{n}-1\right)}{d} = \tan \alpha \left(1 - \frac{4}{n}\right)$$

In order to facilitate the decompression of the fuel in the injection pipe fed by the orifice 7d, it could be advantageous to provide a second groove 19 (FIGURES 12A and 12B) permitting a return to low pressure in the injection pipe terminating at the orifice 7d just after the end of the principal injection.

This return to low pressure will occur when the leading edge 20 of the groove 19 passes over its position of tangency to the orifice 7d, on the leading edge thereof such position being shown in FIGURE 12B and corresponding to the end of the principal injection.

The leading edge 20 of the groove 19 corresponds to a straight line drawn from this point of tangency and having an inclination of $-\tan \alpha$ since the position of the piston at the end of the principal injection will be displaced from the position of zero injection by $$-d \tan \alpha + 2d \tan \alpha = d \tan \alpha$$

The embodiments of the present invention illustrated by FIGURES 13A to 17C are adapted to perform two injections per cycle in each cylinder, the injections being preferably spaced a half cycle from each other, in engines with open pre-ignition chambers, namely those in which the pre-ignition chamber opens into the principal combustion chamber by a relatively large passageway, or in engines whose pre-ignition chambers are more nearly closed and not thermally charged, or also thermally charged engines with direct injection (engines operating a high speed or supercharged engines).

I have observed that in engines of this type the maximum efficiency of the system of double injection cannot be realized except by keeping substantially constant the quantity of fuel delivered by the secondary injection when the total injection varies, or in using at the most an increased absolute amount of fuel for the secondary injection which is sufficiently moderate to correspond to a decreased proportion of the total charge when the latter increases.

A system adapted to perform a double injection of this type will be described with reference to the above described system where the secondary injection is effected at a half cycle interval from the principal injection.

FIGURE 13A shows, as an example, the position of groove 14 in relation to orifice 7d of the distribution channel for a low charge, at the beginning of the injection. The communication having just been shut off between the groove 5c and the orifice 4d, the principal injection commences through the groove 6 and the corresponding orifice 7b.

The secondary injection does not occur until slightly later when the leading edge 16 of the groove 14 uncovers the orifice 7d (FIGURE 13C). These two injections terminate simultaneously when the grooves 5a and 5b enter into communication with the low pressure feed orifices 4b and 4c (as shown in FIGURE 13D).

FIGURE 14A shows the positions of the grooves in relation to the orifices for a medium charge at the beginning of the principal injection.

The injection commences as soon as the groove 5c ceases to communicate with the orifice 4d. A downward displacement of the distributor piston, whereby the charge can be varied, will prevent the groove 14 from communicating with the orifice 7d until after the piston has been rotated through a greater angle than for a low charge. FIGURE 14B corresponding to the end of the injection shows that the principal injection is stopped by bringing the grooves 5a and 5b into communication with the admission orifices 4b to 4c, respectively. The secondary injection is terminated at the same time as the principal injection and will correspond then to a smaller portion of the total charge than the latter.

It will be seen then from FIGURES 15A and 15B which show the positions of the grooves of the piston in relation to the orifices of the bore in the case of a high charge, that the rotation of the piston during the secondary injection is through the same angle as in FIGURES 13A and 13D, or 14A and 14B.

The positions of the grooves of the piston in relation to the orifices of the bore in FIGURES 15A and 15B can be derived from the preceding figures by a simple vertical displacement of the distributor piston in its cylinder, parallel to its axis of rotation.

FIGURE 15A shows the position at the beginning of the principal injection which occurs after the groove 5c ceases to communicate with the feed orifice 4d. The principal injection then occurs through grooves 5b and 6 and orifice 7b, none of the grooves 5 being then in communication with the feed orifices.

This principal injection continues until the grooves 5a and 5b come simultaneously into communication with the orifices 4b and 4c, respectively (as shown in FIGURE 15B).

If it is desired to have a common ending for the principal and secondary injections, the angle of inclination of the leading edge 16 of the groove 14 should be equal to $-\alpha$, where $\alpha$ is the absolute value of the angle of inclination of the grooves 5b and 5c in relation to the axis of the distributor piston.

In fact, if the rotational course of the piston during the principal injection of a low charge is designated as $e$, and its rotational course during the secondary injection as $i$, the leading edge 16 of the groove 14 will not uncover the orifice 7d until after a course equal to $e-i$ (FIGURES 13A and 13C).

If the total charge is to be increased from a low charge to the full charge, the corresponding displacement of the piston $d_m$ will be effected by a rotation of the latter through an angle $-d_m \tan \alpha$ in a direction opposite to its normal direction of rotation. The course corresponding to the principal injection then becomes equal to $2d_m \tan \alpha + e$.

Hence, if it is desired that the course of rotation of the piston for the secondary injection remain equal to $i$, it is necessary that leading edge 16 of the groove 14 should not uncover the orifice 7d until after a rotation of $2d_m \tan \alpha + e - i$, in relation to the beginning of the principal injection of a low charge. The slope of the leading edge 16 of groove 14 should then be equal to:

$$\frac{-d_m \tan \alpha}{d_m} = -\tan \alpha$$

The choice of the course of the secondary injection $i$, which therefore remains invariable whatever may be the total charge, will depend on the engine to which such double injection is applied. By displacing the leading edge of the groove 16 parallel to itself, it is possible to modify this course $i$ and therefore the constant amount of fuel delivered by the secondary injection.

FIGURES 16A, 16B, 17A, 17B and 17C will illustrate a position of the groove 14 in relation to the orifice 7d which insures a simultaneous beginning for the principal and secondary injections. In this case the secondary injection is ended before the end of the principal injection (except for low charges in the particular case where the amount of fuel delivered by the secondary injection is equal to that of the principal injection at low charge) by interruption of the communication between the groove 14 and the orifice 7d before the groove 5b will communicate with the orifice 4c (at the end of the principal injection).

Figure 17A:
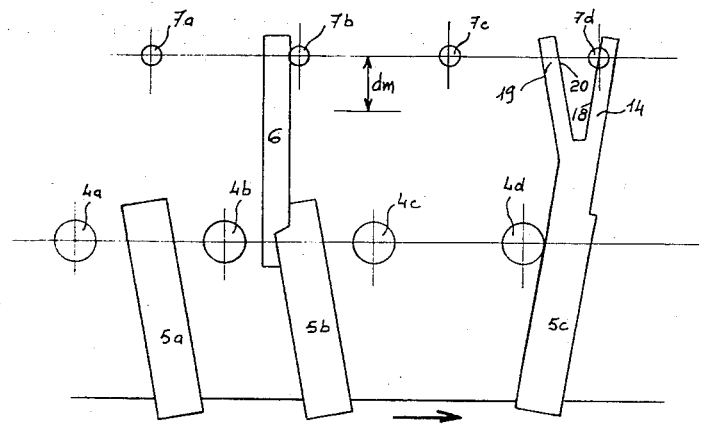
Figure 17B:
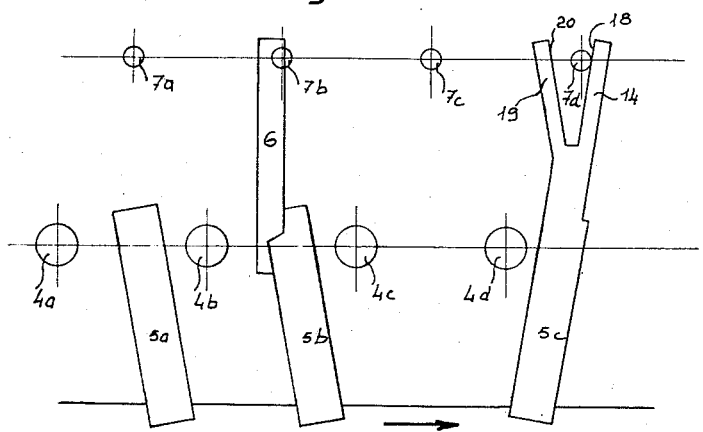
Figure 17C:
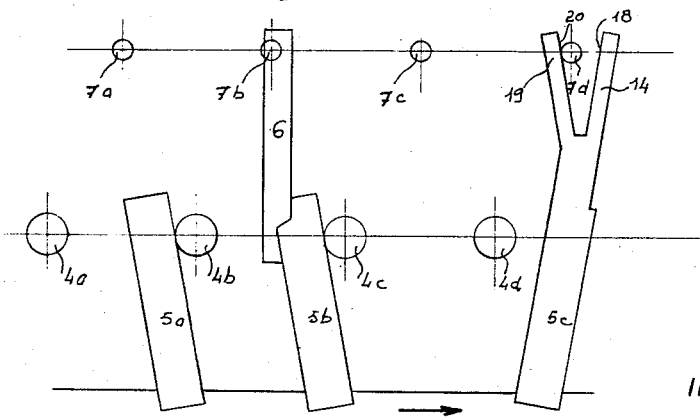

As can be seen on the figure, in such a case the trailing edge 18 of the groove 14 corresponds on the piston in position from the end of the secondary injection to the tangent drawn to the orifice 7d from the trailing side of the latter parallel to the groove 5c (FIGURE 17B).

In fact, the end of the secondary injection with a low charge is produced after a rotation of the piston through an interval $i$, and with a full charge after a rotation of $2d_m \tan \alpha + i$, relative to the beginning of the injection at this level of charge, that is to say, after a rotation of $-d_m \tan \alpha + 2d_m \tan \alpha + i = d_m \tan \alpha + i$ relative to the beginning of the injection with a low charge.

The slope of the trailing edge 18 of the groove 14 is then about equal to:

$$d_m \tan \alpha / d_m = \tan \alpha$$

In order to facilitate the decompression of the fuel in the injection piping from orifice 7d, it can be advantageous to provide a second groove 19 (FIGURES 16A, 16B, 17A, 17B and 17C), permitting the injection channels that are connected to the orifice 7d to return to low pressure, just after the end of the principal injection.

This return occurs when the edge 20 of groove 19 passes the position of tangency of the orifice 7d at the leading side of the latter (the position of tangency represented in FIGURES 16B and 17C), corresponding to the end of the principal injection.

The leading edge 20 of the groove 19 will correspond to a straight line from the point of tangency, having an inclination of $-\tan \alpha$ since the position of the piston at the end of the principal injection with a full charge will be displaced relative to the position at the end of the principal injection with a low charge by:

$$-d_m \tan \alpha + 2d_m \tan \alpha = d_m \tan \alpha$$

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A fuel injection pump for internal combustion engines, permitting two injections per engine cycle in each cylinder, said injections comprising a principal injection at the end of the compression stroke of said engine, and a secondary injection preceding said principal injection, said pump comprising:
 (a) a pump shaft;
 (b) a pump housing provided with a cylindrical bore communicating with an annular space;
 (c) feed orifices and discharge orifices opening in said bore;
 (d) a rotatable distributor piston coaxially mounted in said bore with a small clearance between said piston and said bore;
 (e) means for displacing said piston along a direction parallel to its axis of rotation;
 (f) means for rotating said piston about its axis, driven by said pump shaft;
 (g) a plurality of fuel feeding grooves located in the cylindrical surface of said distributor piston and communicating with said annular space;
 (h) a first discharge groove located in said cylindrical surface and in permanent communication with one of said fuel feeding grooves;
 (i) a second discharge groove located in said cylindrical surface and permanently communicating with another of said fuel feeding grooves, whereby rotation of said rotatable distributor piston intermittently connects said feed orifices through said fuel feeding grooves with said annular space providing a fuel charge therein, and said discharge grooves intermittently connect said annular space with said discharge orifices for delivering said fuel charge, the amount of said fuel charge delivered through both of said discharge grooves being simultaneously regulated by said means for displacing said piston along a direction parallel to its axis of rotation; and
 (j) means for forcing said fuel from said annular space through said feed and discharge grooves to said discharge orifices, wherein said second discharge groove has a leading edge corresponding, with said distributor piston in position for the beginning of said secondary injection at a low charge, to a straight tangent to the discharge orifice on the leading edge thereof and having a slope with respect to the axis of the distributor piston, equal to $$-\left(\tan \alpha + \frac{e - f - \epsilon}{d_m}\right)$$

where $\alpha$ is the absolute value of the angle of inclination, relative to the axis of the distributor piston, of the feed grooves associated respectively with the first and second discharge grooves, $e$ is the peripheral distance covered by the piston during the secondary injection at low charge, $\epsilon$ is the peripheral distance covered by the piston during the secondary injection at full charge, and $d_m$ is the longitudinal displacement of the piston, parallel to its axis, which corresponds to the passage from low charge to full charge.

2. A fuel injection pump for internal combustion engines, permitting two injections per engine cycle in each cylinder, said injections comprising a principal injection at the end of the compression stroke of said engine, and a secondary injection preceding said principal injection, said pump comprising:
 (a) a pump shaft;
 (b) a pump housing provided with a cylindrical bore communicating with an annular space;
 (c) feed orifices and discharge orifices opening in said bore;
 (d) a rotatable distributor piston coaxially mounted in said bore with a small clearance between said piston and said bore;
 (e) means for displacing said piston along a direction parallel to its axis of rotation;
 (f) means for rotating said piston about its axis, driven by said pump shaft;
 (g) a plurality of fuel feeding grooves located in the cylindrical surface of said distributor piston and communicating with said annular space;

(h) a first discharge groove located in said cylindrical surface and in permanent communication with one of said fuel feeding grooves;

(i) a second discharge groove located in said cylindrical surface and permanently communicating with another of said fuel feeding grooves, whereby rotation of said rotatable distributor piston intermittently connects said feed orifices through said fuel feeding grooves with said annular space providing a fuel charge therein, and said discharge grooves intermittently connect said annular space with said discharge orifices for delivering said fuel charge, the amount of said fuel charge delivered through both of said discharge grooves being simultaneously regulated by said means for displacing said piston along a direction parallel to its axis of rotation; and (j) means for forcing said fuel from said annular space through said feed and discharge grooves to said discharge orifices, wherein said second discharge groove has a trailing edge corresponding, with said distributor piston in position for the end of said secondary injection at a low charge, to a straight tangent to the discharge orifice on the leading edge thereof and having a slope relative to the axis of the distributor piston equal to $$\tan \alpha + \frac{e-f-\epsilon}{d_m}$$

3. A fuel injection pump according to claim 2, wherein said distributor piston has a supplementary groove opening into the same feed groove with the second discharge groove and serving to bring the fuel in the secondary injection pipe substantially back to the feed pressure after the end of the two injections, the supplementary groove having its leading edge tangent to the discharge orifice at the leading edge thereof, when the piston is in a position corresponding to the end of injection at the lowest charge, and inclined with respect to the axis of rotation of the distributor piston by the angle $-\alpha$.

4. A fuel injection pump for internal combustion engines, permitting two injections per engine cycle in each cylinder, said injections comprising a principal injection at the end of the compression stroke of said engine, and a secondary injection preceding said principal injection, said pump comprising:

(a) a pump shaft;
(b) a pump housing provided with a cylindrical bore communicating with an annular space;
(c) feed orifices and discharge orifices opening in said bore;
(d) a rotatable distributor piston coaxially mounted in said bore with a small clearance between said piston and said bore;
(e) means of displacing said piston along a direction parallel to its axis of rotation;
(f) means for rotating said piston about its axis, driven by said pump shaft;
(g) a plurality of fuel feeding grooves located in the cylindrical surface of said distributor piston and communicating with said annular space;
(h) a first discharge groove located in said cylindrical surface and in permanent communication with one of said fuel feeding grooves;
(i) a second discharge groove located in said cylindrical surface and permanently communicating with another of said fuel feeding grooves, whereby rotation of said rotatable distributor piston intermittently connects said feed orifices through said fuel feeding grooves with said annular space providing a fuel charge therein, and said discharge grooves intermittently connect said annular space with said discharge orifices for delivering said fuel charge, the amount of said fuel charge delivered through both of said discharge grooves being simultaneously regulated by said means for displacing said piston along a direction parallel to its axis of rotation; and (j) means for forcing said fuel from said annular space through said feed and discharge grooves to said discharge orifices, wherein said second discharge groove has a leading edge corresponding, with said distributor piston in position for no injection, to a straight tangent to the discharge orifice on the leading edge thereof and having a slope, with respect to the axis of the distributor piston, equal to $$\tan \alpha \left(\frac{4}{n}-1\right)$$

where $\alpha$ is the absolute value of the angle of inclination, relative to the axis of the distributor piston, of the feed grooves associated respectively with the first and second discharge grooves and $2/n$ the proportion of the injection stroke of the piston covered by said piston during the secondary injection.

5. A fuel injection pump for internal combustion engines, permitting two injections per engine cycle in each cylinder, said injections comprising a principal injection at the end of the compression stroke of said engine, and a secondary injection preceding said principal injection, said pump comprising:

(a) a pump shaft;
(b) a pump housing provided with a cylindrical bore communicating with an annular space;
(c) feed orifices and discharge orifices opening in said bore;
(d) a rotatable distributor piston coaxially mounted in said bore with a small clearance between said piston and said bore;
(e) means for displacing said piston along a direction parallel to its axis of rotation;
(f) means for rotating said piston about its axis, driven by said pump shaft;
(g) a plurality of fuel feeding grooves located in the cylindrical surface of said distributor piston and communicating with said annular space;
(h) a first discharge groove located in said cylindrical surface and in permanent communication with one of said fuel feeding grooves;
(i) a second discharge groove located in said cylindrical surface and permanently communicating with another of said fuel feeding grooves, whereby rotation of said rotatable distributor piston intermittently connects said feed orifices through said fuel feeding grooves with said annular space providing a fuel charge therein, and said discharge grooves intermittently connect said annular space with said discharge orifices for delivering said fuel charge, the amount of said fuel charge delivered through both of said discharge grooves being simultaneously regulated by said means for displacing said piston along a direction parallel to its axis of rotation; and (j) means for forcing said fuel from said annular space through said feed and discharge grooves to said discharge orifices, wherein said second discharge groove has a trailing edge corresponding, with said distributor piston in position for the end of the secondary injection to a straight tangent to the discharge orifice on the trailing edge thereof and having a slope, with respect to the axis of the distributor piston, equal to $$\tan \alpha \left(1-\frac{4}{n}\right)$$

where $\alpha$ is the absolute value of the angle of inclination, relative to the axis of the distributor piston, of the feed grooves associated respectively with the first and second discharge grooves and $2/n$ the proportion of the injection stroke of the piston covered by said piston during the secondary injection.

6. A fuel injection pump according to claim 5, wherein said distributor piston has a supplementary groove opening into the same feed groove with the second discharge groove and serving to bring the fuel in the secondary injection pipe substantially back to the feed pressure after the end of the two injections, the supplementary groove having its leading edge tangent to the discharge orifice at the leading edge thereof, when the piston is in a position corresponding to the end of injection at the lowest charge, and inclined with respect to the axis of rotation of the distributor piston by the angle $-\alpha$.

7. A fuel injection pump for internal combustion engines, permitting two injections per engine cycle in each cylinder, said injections comprising a principal injection at the end of the compression stroke of said engine, and a secondary injection preceding said principal injection, said pump comprising:
(a) a pump shaft;
(b) a pump housing provided with a cylindrical bore communicating with an annular space;
(c) feed orifices and discharge orifices opening in said bore;
(d) a rotatable distributor piston coaxially mounted in said bore with a small clearance between said piston and said bore;
(e) means for displacing said piston along a direction parallel to its axis of rotation;
(f) means for rotating said piston about its axis, driven by said pump shaft;
(g) a plurality of fuel feeding grooves located in the cylindrical surface of said distributor piston and communicating with said annular space;
(h) a first discharge groove located in said cylindrical surface and in permanent communication with one of said fuel feeding grooves;
(i) a second discharge groove located in said cylindrical surface and permanently communicating with another of said fuel feeding grooves, whereby rotation of said rotatable distributor piston intermittently connects said feed orifices through said fuel feeding grooves with said annular space providing a fuel charge therein, and said discharge grooves intermittently connect said annular space with said discharge orifices for delivering said fuel charge, the amount of said fuel charge delivered through both of said discharge grooves being simultaneously regulated by said means for displacing said piston along a direction parallel to its axis of rotation; and
(j) means for forcing said fuel from said annular space through said feed and discharge grooves to said discharge orifices, wherein said second discharge groove has a leading edge corresponding, with said distributor piston in position for the beginning of the secondary injection to a straight tangent to the discharge orifice on the leading edge thereof and having an inclination, with respect to the axis of the distributor piston, equal to $-\alpha$, where $\alpha$ is the absolute value of the angle of inclination with respect to said distributor piston of the feed grooves associated respectively with the first and the second discharge grooves.

8. A fuel injection pump for internal combustion engines, permitting two injections per engine cycle in each cylinder, said injections comprising a principal injection at the end of the compression stroke of said engine, and a secondary injection preceding said principal injection, said pump comprising:
(a) a pump shaft;
(b) a pump housing provided with a cylindrical bore communicating with an annular space;
(c) feed orifices and discharge orifices opening in said bore;
(d) a rotatable distributor piston coaxially mounted in said bore with a small clearance between said piston and said bore;
(e) means for displacing said piston along a direction parallel to its axis of rotation;
(f) means for rotating said piston about its axis, driven by said pump shaft;
(g) a plurality of fuel feeding grooves located in the cylindrical surface of said distributor piston and communicating with said annular space;
(h) a first discharge groove located in said cylindrical surface and in permanent communication with one of said fuel feeding grooves;
(i) a second discharge groove located in said cylindrical surface and permanently communicating with another of said fuel feeding grooves, whereby rotation of said rotatable distributor piston intermittently connects said feed orifices through said fuel feeding grooves with said annular space providing a fuel charge therein, and said discharge grooves intermittently connect said annular space with said discharge orifices for delivering said fuel charge, the amount of said fuel charge delivered through both of said discharge grooves being simultaneously regulated by said means for displacing said piston along a direction parallel to its axis of rotation; and
(j) means for forcing said fuel from said annular space through said feed and discharge grooves to said discharge orifices, wherein said second discharge groove has a trailing edge corresponding, with said distributor piston in position for the end of the secondary injection to a straight tangent to the discharge orifice on the trailing edge thereof and having an inclination with respect to the axis of the distributor piston equal to $+\alpha$, where $\alpha$ is the absolute value of the angle of inclination, with respect to the axis of said distributor piston, of the feed grooves associated respectively with the first and the second discharge grooves.

9. A fuel injection pump according to claim 8, wherein said distributor piston has a supplementary groove opening into the same feed groove with the second discharge groove and serving to bring the fuel in the secondary injection pipe substantially back to the feed pressure after the end of the two injections, the supplementary groove having its leading edge tangent to the discharge orifice at the leading edge thereof, when the piston is in a position corresponding to the end of injection at the lowest charge, and inclined with respect to the axis of rotation of the distributor piston by the angle $-\alpha$.

10. A fuel injection pump for internal combustion engines permitting two injections per engine cycle in each cylinder, said injections comprising a principal injection at the end of the compression stroke of said engine, and a secondary injection preceding said principal injection, said pump comprising:
(a) a pump shaft;
(b) a pump housing provided with a cylindrical bore communicating with an annular space;
(c) feed orifices and discharge orifices opening in said bore;
(d) a rotatable distributor piston coaxially mounted in said bore with a small clearance between said piston and said bore;
(e) means for displacing said piston along a direction parallel to its axis of rotation;
(f) means for rotating said piston about its axis, driven by said pump shaft;
(g) a plurality of fuel feeding grooves located in the cylindrical surface of said distributor piston and communicating with said annular space;
(h) a first discharge groove located in said cylindrical surface and in permanent communication with one of said fuel feeding grooves;
(i) a second discharge groove located in said cylindrical surface and permanently communicating with another of said fuel feeding grooves, whereby rotation of said rotatable distributor piston intermittently connects said feed orifices through said fuel feeding grooves with said annular space providing a fuel charge therein, and said discharge grooves intermittently connect said annular space with said discharge orifices for delivering said fuel charge, the amount of said fuel charge delivered through both of said discharge grooves being simultaneously regulated by said means for displacing said piston along a direction parallel to its axis of rotation; and (j) means for forcing said fuel from said annular space through said feed and discharge grooves to said discharge orifices.

References Cited

UNITED STATES PATENTS

| | | | |
|---|---|---|---|
| 2,871,796 | 2/1959 | Dreisin et al. | 103—154 |
| 2,960,079 | 11/1960 | Monnot et al. | 123—32.61 XR |
| 2,974,657 | 3/1961 | Bessiere | 123—32.61 XR |
| 3,091,231 | 5/1963 | Giraudon | 123—140 |

FOREIGN PATENTS 1,336,201  7/1963  France.

DONLEY J. STOCKING, *Primary Examiner.*

W. J. KRAUSS, *Assistant Examiner.*